(12) United States Patent
Berkooz et al.

(10) Patent No.: US 7,174,283 B2
(45) Date of Patent: Feb. 6, 2007

(54) METHOD FOR ISOLATING SOURCES OF DRIFTS IN OUTPUT PROPERTIES FOR MACHINES AND PROCESSES

(75) Inventors: Oded Berkooz, Holon (IL); Moshe Evenor, Rishon (IL); Robert Landon Roach, Ramat Hasharon (IL)

(73) Assignee: Pronetix Ltd (IL)

( * ) Notice: Subject to any disclaimer, the term of this patent is extended or adjusted under 35 U.S.C. 154(b) by 489 days.

(21) Appl. No.: 10/483,879

(22) PCT Filed: Jul. 8, 2002

(86) PCT No.: PCT/IL02/00551

§ 371 (c)(1),
(2), (4) Date: Jan. 14, 2004

(87) PCT Pub. No.: WO03/009073

PCT Pub. Date: Jan. 30, 2003

(65) Prior Publication Data

US 2004/0176116 A1 Sep. 9, 2004

(30) Foreign Application Priority Data

Jul. 16, 2001 (IL) .................................. 144358

(51) Int. Cl.
*G06F 17/10* (2006.01)

(52) U.S. Cl. ............................... 703/2; 700/29

(58) Field of Classification Search .................... 703/2, 703/6; 700/28–31, 38, 45, 51; 702/84
See application file for complete search history.

(56) References Cited

U.S. PATENT DOCUMENTS

| | | | |
|---|---|---|---|
| 5,335,164 A | 8/1994 | Gough, Jr. et al. | ......... 364/149 |
| 5,402,333 A | 3/1995 | Cardner | |
| 5,408,405 A | 4/1995 | Mozumder et al. | |
| 5,655,110 A | 8/1997 | Krivokapic et al. | |

(Continued)

FOREIGN PATENT DOCUMENTS

EP      0 315 307 B1      6/1994

(Continued)

*Primary Examiner*—Albert W. Paladini
(74) *Attorney, Agent, or Firm*—Fleit Kain Gibbons Gutman Bongini & Bianco; Martin Fleit; Paul D. Bianco

(57) ABSTRACT

A method for determining a root cause for a drift in a process or a machine, the function of which is determined by a model describing a relationship between setup and/or input variables and output property or properties, comprising the steps of: (a) Assigning desired output properties for a product of said machine or process, and allowed ranges for said properties; (b) Assigning original values to said variables for obtaining by said machine or process said assigned output properties within said assigned ranges; (c) Measuring the various output properties of the machine or process; (d) When measuring an output property of the machine or process that drifts from its assigned value, substituting the one or more measured output properties in their corresponding model equations, and calculating for each variable in each equation its presumed value, assuming it is the sole cause of the drift; and (e) Analyzing all presumed calculated variable values and the measured values of the output properties of the machine or process to determine the variable that is most probably responsible for the drift.

14 Claims, 4 Drawing Sheets

U.S. PATENT DOCUMENTS

| | | |
|---|---|---|
| 5,838,595 A | 11/1998 | Sullivan et al. |
| 5,957,063 A * | 9/1999 | Koseki et al. ............... 110/188 |
| 6,119,047 A | 9/2000 | Eryurek et al. ................ 700/28 |
| 6,539,267 B1 * | 3/2003 | Eryurek et al. ................ 700/51 |
| 6,735,484 B1 * | 5/2004 | Lenz ........................... 700/51 |
| 6,804,563 B1 * | 10/2004 | Lafaye de Micheaux ..... 700/51 |
| 6,901,340 B1 * | 5/2005 | Pasadyn et al. ................ 702/84 |

FOREIGN PATENT DOCUMENTS

| | | |
|---|---|---|
| WO | WO 01/48571 A1 | 7/2001 |
| WO | WO 01/57605 A1 | 8/2001 |

* cited by examiner

METHOD FOR ISOLATING SOURCES OF DRIFTS IN OUTPUT PROPERTIES FOR MACHINES AND PROCESSES

FIELD OF THE INVENTION

The present invention relates to methods for identifying the root cause or causes for changes in output properties of a process.

BACKGROUND OF THE INVENTION

In any manufacturing process, there are process machines which take multiple inputs (such as gases, materials, power, etc.), provide local environments (such as pressure, temperature, etc.), and change either the shape or some set of properties of the operant material(s). The output is a specific arrangement of new properties (e.g., thickness, index of refraction, stress, geometry, etc.) on the operant material, and are called herein either the output, the product, or the goal.

In order to predict the output of a machine (hereinafter, whenever the term "machine" is used, it should be understood that it may also refer to a process) for a specific set of inputs, there is a need to provide a model of the machine.

One type of a model that describes the behavior and the operation of a machine is the physical model. A physical model comprises a set of mathematical functions and formulas based on scientific understanding of the machine and process. Physical models often contain some calibration constants which are related to some physical characteristic of the process but for which the first principle knowledge is either limited or lacking. These constants may be adjusted to allow the model to properly simulate the process.

Other types of models, like data based models, or others only try to fit experimental data from the machine to simple functions. These models are constructed by means of carrying out experiments and/or accumulating a large amount of raw data relating to the characteristics of the output product versus different sets of inputs. They are generally used in cases where the physical model is not known. These models treat the machine as a "black box", and try to predict the properties of the output product versus the inputs, based on experimental results using simple formulas with undetermined constants. Constants in the simple functions are evaluated by fitting the functions through the data. Thus, the constants also allow the model to simulate the process, but unlike the physical model, they are not connected to any physical characteristic. For this reason, physical models are usually more accurate. A major point to be noted here is that the simple functions used in these data based models have no relation to the actual behavior of the physical mechanisms present in the process and hence cannot generally be used in the present invention, as discussed hereinafter. However, in cases when these models fortuitously or by design do properly account for the physical mechanisms of the process, then such models could also be used in the present invention. Such latter cases are within the scope of this invention. When the term 'physical model' is used in this disclosure, it is understood that this includes any model, which properly follows the behavior of physical mechanisms.

Important applications of accurate models of a process include process optimization (i.e., finding a setup which optimizes some cost function of the output, see, for example, Israeli Patent Application 134,380) and certain aspects of failure analysis including health monitoring, and diagnostics. This invention addresses the latter by describing the methods of determining the root cause or causes of changes in the output properties.

Nearly every process can experience change in the output properties with time. These changes are caused by some drift in one or more of the inputs, or from some other changes in the properties of the process machine and its environment with no change by the operator of the input settings. Each of these possible mechanisms results in a more or less unique pattern of variation in the machine operation and the output properties versus time.

It has been found by the inventors that if one has the great advantage of having an accurate physical model of a process, it is possible to use the model to determine which mechanism or mechanisms is the cause of the change. This is a major component of process machine health monitoring and diagnostics. The present invention embodies the application of accurate models to such determinations.

Changes in output properties in a process will eventually trigger some sort of alarm. This leads generally to requiring changes in the inputs or, worse, cessation of the process for maintenance. Changes to inputs may allow for a return of output properties to desired levels, but the underlying cause for the drift is not addressed. Cessation of the process for maintenance typically restores the machine to proper working order, but frequently a more comprehensive and expensive refurbishing is performed because the underlying cause of the drift is not understood. If such an understanding is available, a much more effective and simpler remedy would result in more machine availability, closer adherence to desired output properties, reduction in production cost and much better control of the process.

The present invention shows that by taking the advantage of having an accurate physical model of a process, and by having a small amount of measured data, the cause/s for changes to output properties can be identified and controlled.

The essence of the invention is that an accurate model can provide extra information unavailable by any other source, of monitoring changes to the process machine and diagnosing these changes. This includes information regarding possible states of the machine for any measured output, derivatives of the output quantities with respect to input quantities, and possible paths of output change with a change in one of the inputs, to name a few. Several methods for diagnosis or cause analysis can then be envisioned, which, along with data routinely collected during production can assist in maintaining product quality, reducing repair time of machines, early detection of problems, diagnosis of which mechanism or controller has drifted out of spec, and general health monitoring.

SUMMARY OF THE INVENTION

The present invention relates to a method for determining a root cause for a drift in a process or a machine, the function of which is determined by a model describing a relationship between setup and/or input variables and output property or properties, which comprises: (a) assigning desired output properties for a product of said machine or process, and allowed ranges for said properties; (b) assigning original values to said variables for obtaining by said machine or process said assigned output properties within said assigned ranges; (c) measuring the various output properties of the machine or process; (d) when measuring an output property of the machine or process that drifts from its assigned value, substituting the one or more measured output properties in their corresponding model equations, and calculating for each variable in each equation its presumed value, assuming it is the sole cause of the drift; (e) analyzing all presumed calculated variable values and the measured values of the output properties of the machine or process to determine the variable that is most probably responsible for the drift.

Preferably, the model is a physical model or any other model type that predicts process outputs given the values substituted for the variable, with sufficient accuracy.

According to an embodiment of the invention the variable which is determined as the one responsible for the drift is the variable for which all its presumed calculated values are found to be the same for all output properties.

According to another embodiment of the invention, the variable which is determined as the one responsible for the drift is the variable for which all its presumed calculated values are found to be the same for all output properties, taking into account variations due to statistical distributions of the output properties and measurement errors.

In still another embodiment of the invention the measuring step comprises (a) measuring of a series of output measurements during different production times; (b) when a drift is realized in a measured output property, assigning a first early output measurement as a starting measurement, and a later output measurement as an ending measurement; (c) the substituting step comprises, for each variable, defining its said original assigned value as the starting input value, and substituting the ending measurement in the model, and calculating for each variable its presumed ending input value, assuming it is the sole cause of the drift; (d) in the analyzing step, for a plurality of points in the range between the starting input value and the ending input value of each variable, calculating from the model corresponding output values, assuming the other variables having values as originally assigned for obtaining the assigned output property; (e) determining the variable whose output values calculated in step (d) are most similar to the output measured values, as the one most probably responsible for the drift.

In still another embodiment of the invention the determining step comprises: (a) for each variable, drawing a curve between its calculated output values, therefore obtaining an output curve corresponding to each variable; and (b) determining the variable whose output curve is most similar to the output measured values, as the one most probably responsible for the drift.

Preferably, it is advisable to take into account statistical distributions of the output properties and measurement variation errors, in order to obtain more reliable results.

According to still another embodiment of the invention, the analyzing step comprises the steps of: (a) Finding a new set of variables being each within a limited range from its original value, that when the new set of variables, supplemented one at a time with the calculated amount of drift in each variable, is substituted in the model, results in sufficiently remote one from the other output property values; (b) Calculating from the model separately for each presumed variable drift, by evaluating the model while substituting the new set and each of the presumed drifts in turn; (c) Performing an experiment in which the said found new set of variables are substituted in the production machine or process, and obtaining an experimental output; and (d) Assigning the variable for which the calculated output is closest to the said experimental output as the variable responsible for the drift.

Preferably, said new set of variables is found by applying directional derivatives to the model separately with respect to variable.

Preferably, the new set of variables is selected such that it provides outputs which differ by more than the statistical variation of the machine or process, while staying as close as possible to the original values as assigned, to obtain sufficiently remote one from the other output property values.

Preferably, in carrying out any of the above procedures, it is advisable to take into account statistical distributions of the output properties and measurement variation errors, in order to obtain more reliable results.

In any of the above procedures, the input variables of the machine or process may represent inputs and/or or internal mechanisms.

DETAILED DESCRIPTION OF PREFERRED EMBODIMENTS

Figure 1:
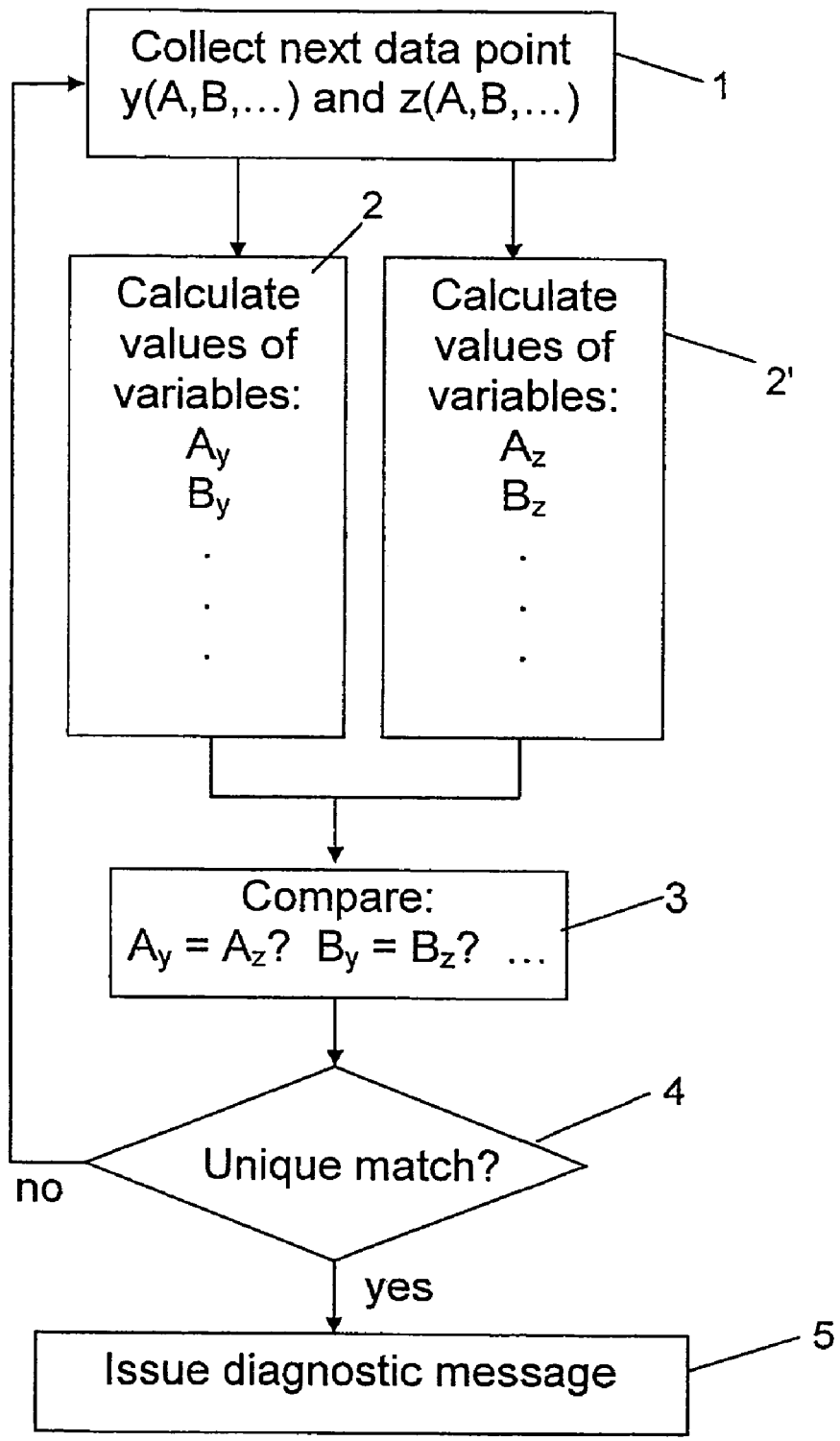
FIG. 1 illustrates in flow diagram form a first embodiment of the method of the invention.

The present invention provides means for determining the cause or causes of changes in machines or processes. Hereinafter, if not otherwise specifically indicated, when the term "machine" is used, it should be understood that it relates to a "process" as well, and vice versa, when the term "process" is used, it should be understood that it relates to a "machine" as well.

A process subject to the type of changes described here has an initial setup with corresponding product properties (referred to as output or output properties) which change with operation time without any machine operator change of the setup. The setup is defined as the set of values comprising input settings controlled by the operator. Other internal mechanisms which can change during the process may also cause or contribute to changes in the output properties. Models, which include effects of such internal mechanisms, are included within the scope of the present invention.

Notations:

Model—according to the present invention the model that is used to describe the behavior of the process or the machine comprises a set of at least one equation. Each equation comprises a plurality of variables that when values are substituted for said variables, the equation provides a value of an output property. The output properties are denoted herein as x, y, z . . . etc. The model which is used according to the present invention is the one known as the physical model, or any other model which accurately predicts the relationships between the inputs and outputs.

Equation Variables—According to the present invention each equation variable A, B, C, D, . . . etc. relates to either a specific input or an internal mechanism. The values that are substituted for each variable and the combination of the variable values substituted in each equation determine the value of the output property. The notations $A_1$, $B_1$, $C_1$, $D_1$, . . . etc. indicate variable values that have been substituted in an equation, or calculated in a same time, and for a same specific output product value, for example $y_1$. At another time, the same variables may be indicated, for example, as $A_2, B_2, C_2, D_2, \ldots$ etc, for a product value $y_2$. A combination of variable values in a model at a same specific time determines an operation point of the machine or product, and is referred to herein as a set point.

A starting point—according to the present invention a starting point is defined as an early state of the process during which the process operates properly. More particularly, a starting point relates to a set-up and/or input values, and/or output values at a state of the process during which the process operates properly.

An ending point—is defined as a late state of the process in which the process deviates from the starting point. More particularly, an ending point relates first the output values at a specific state of the process during which the process has deviated from the starting point. It is a major point of this invention that the model is then used to calculate corresponding a series of presumed input values such that each calculated presumed input, along with the other variables held fixed at their starting values represent possible states of the machine at the ending point.

Drift—is defined as an unintended change in the input variables or internal mechanisms, which causes a change in the measured output property or properties.

Data point—is defined as the measured value of an output property or properties.

Changes in the output properties are caused by a drift in one or more of the variables (inputs and/or internal mechanisms) without any applied change to the machine settings. For example, if an input controller is gradually failing, then it is possible to think that one value for the input is being changed when it is actually another. Another example is the buildup of contaminants or residues inside a process chamber affecting output properties. In neither case did the operator change any of the input settings, and yet the output properties changed. Often, as changes in the output quantities are observed from data collected during the process, adjusting the machine settings (inputs and/or internal mechanisms) can result in maintaining, for a while, the required output properties. However, this only compensates for the unknown cause of the changes and eventually, the operator will no longer be able to maintain the output properties.

It is an object of the present invention to provide means for determining the cause or causes of changes in output properties, either during the process or after. The main idea of the present invention is that an accurate model of a machine or process enables calculation of a possible drift of each variable of the model from its assigned value, and when all such possible drifts of all variables are calculated, the invention provides means for determining which of the variables is most probably responsible for the drift in the output property.

The invention provides three embodiments. In the first embodiment outputs for a plurality (more than one) of properties are measured. The second embodiment uses an entire accumulated set of data and can also be continuously applied as more data is collected. The third embodiment steps out from production and performs a single specific test or a set of tests at one or more setups quite different from the production pre-assigned setup, and is able to determine the cause for a drift. In this case the production is interrupted to perform the single extra test or the set of tests.

These above embodiments can generally be applied each one separately, in any order, and/or in any combination and are only given as examples of invention. A typical, but not limited procedure, is the one that begins with carrying out the first embodiment to see whether any of the possible causes can be eliminated. If not, it proceeds to the second embodiment. If the cause has still not been determined, then the third is most likely to make a definite determination.

FIG. 1 is a block diagram describing the method for determining the cause or causes of a process (or machine) drift, according to a first embodiment of the invention. The method requires measurement of more than one output property. FIG. 1 describes a case in which two properties, y, and z, are measured, and in which a plurality of variables, A, B, C, . . . exist in the model. However, the embodiment is applicable for any plurality of output properties and/or variables. The method assumes that measurement of at least one data point exists. That means that measurement results of all output properties relating to at least one setup, are available. In step 1 a specific data point is selected. For this data point, the measurement of the properties y and z are available. In step 2 and 2', y and z are correspondingly substituted in their separate expressions in the model, and also all the known values of all the variables, excluding the first variable A.

Next, the values $A_y$, $A_z$ relating to the first variable are correspondingly and separately calculated from the expressions of y and z. Similarly, for calculating $B_y$ and $B_z$, y and z are correspondingly substituted in their separate expressions in the model, and also all the known values of all the variables, excluding the second variable B. Such calculations follow in steps 2 and 2' for all the remaining variables C, D, . . . etc. Then, in step 3 a comparison is made between the values of the variables $A_y$ and $A_z$, $B_y$ and $B_z$ . . . . etc. The variable for which a match is found is determined as the one responsible for the drift. If however, no match is found within a reasonable measuring error, the same procedure can be repeated for a next data point.

More particularly, the first embodiment comprises the performing of the following steps:
  a. Collecting for a given setup measured values of a plurality of output properties;
  b. Substituting each measured output property in its corresponding model equation, and calculating for each variable in that equation its presumed value, assuming it is the sole cause of the drift;
  c. For each variable, comparing its calculated presumed values; and
  d. Assigning as the variable responsible for the drift the one for which all presumed calculated values are the same for all output properties.

Figure 2:
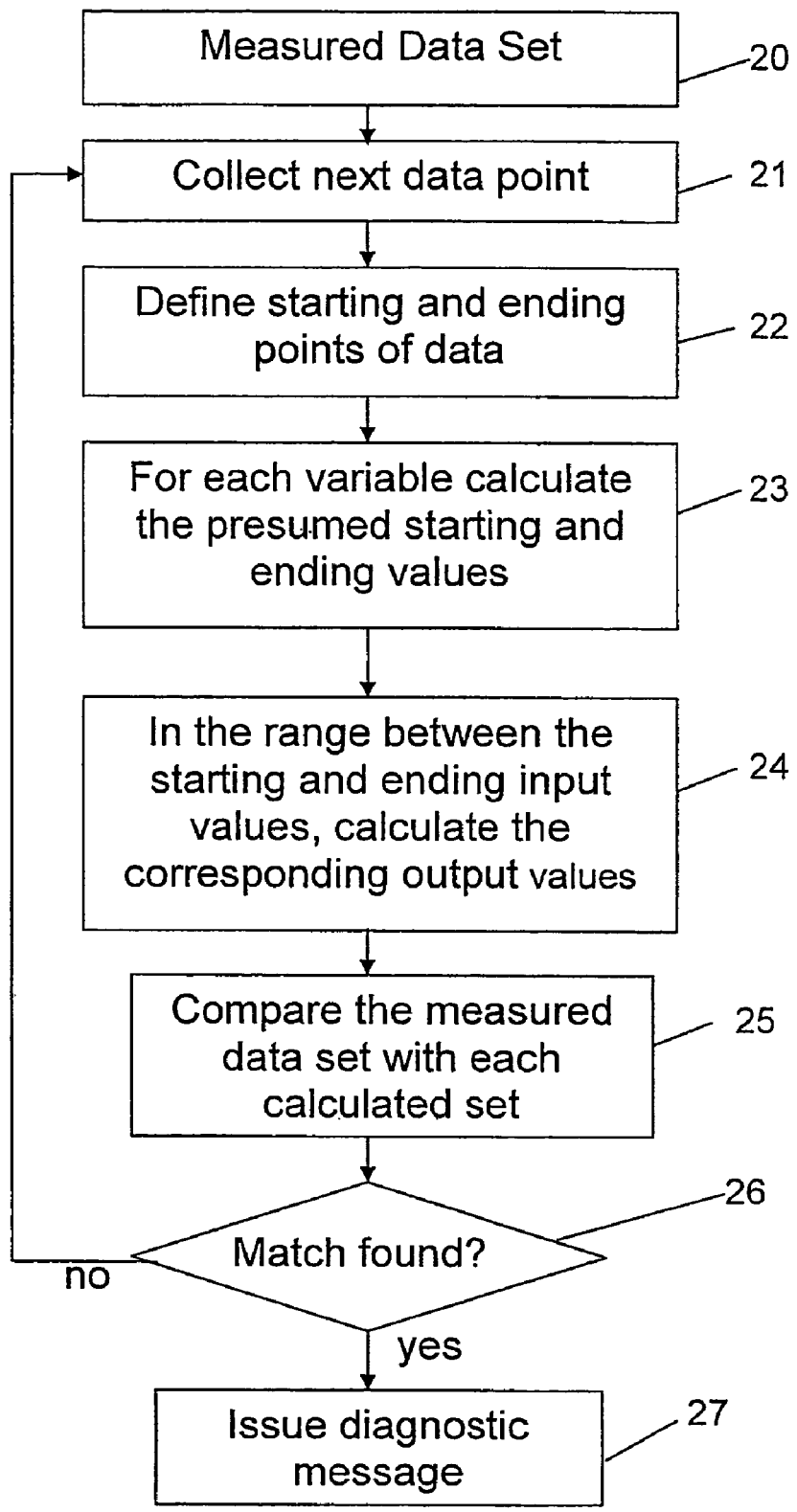
FIG. 2 illustrates in flow diagram form a second embodiment of the method of the invention.

FIG. 2 is a block diagram describing a second embodiment for determining the variable responsible for the process (or machine) drift. The embodiment comprises the following steps:
  a. Carrying out continuously or at various intervals, a determination for an output property, and forming a data set. The data set thus consists of a sequential series of measurement values of the output property (step 20 and 21).
  b. Defining from the data set a starting measurement point and an ending measurement point. With data scatter, these may be determined by some sort of curve fitting. Usually, the starting value of the output thus computed corresponds to the output obtained from the starting setup and machine conditions (step 22).
  c. Using the process model, calculating the presumed value of each variable, assuming it is the sole cause for the drift (step 23).
  d. In the range between the starting input value and the ending input value of each variable, calculating from the model corresponding output values, assuming the other variables having values as originally assigned (step 24).

e. Determining the variable whose output values calculated in the previous step are most similar to the output measured values, as the one most probably responsible for the drift (steps 25 and 26).

f. If a determination is made within reasonable statistical variation, issue a diagnostic message (step 27).

g. If not, collect a next data point (step 21).

It should be noted that the above embodiment was explained for one measured property. The same procedure can be applied to the case of multiple outputs as well. In such a case, for example, "a least squares combination" between the measured outputs and the calculated outputs can be used.

Figure 3:
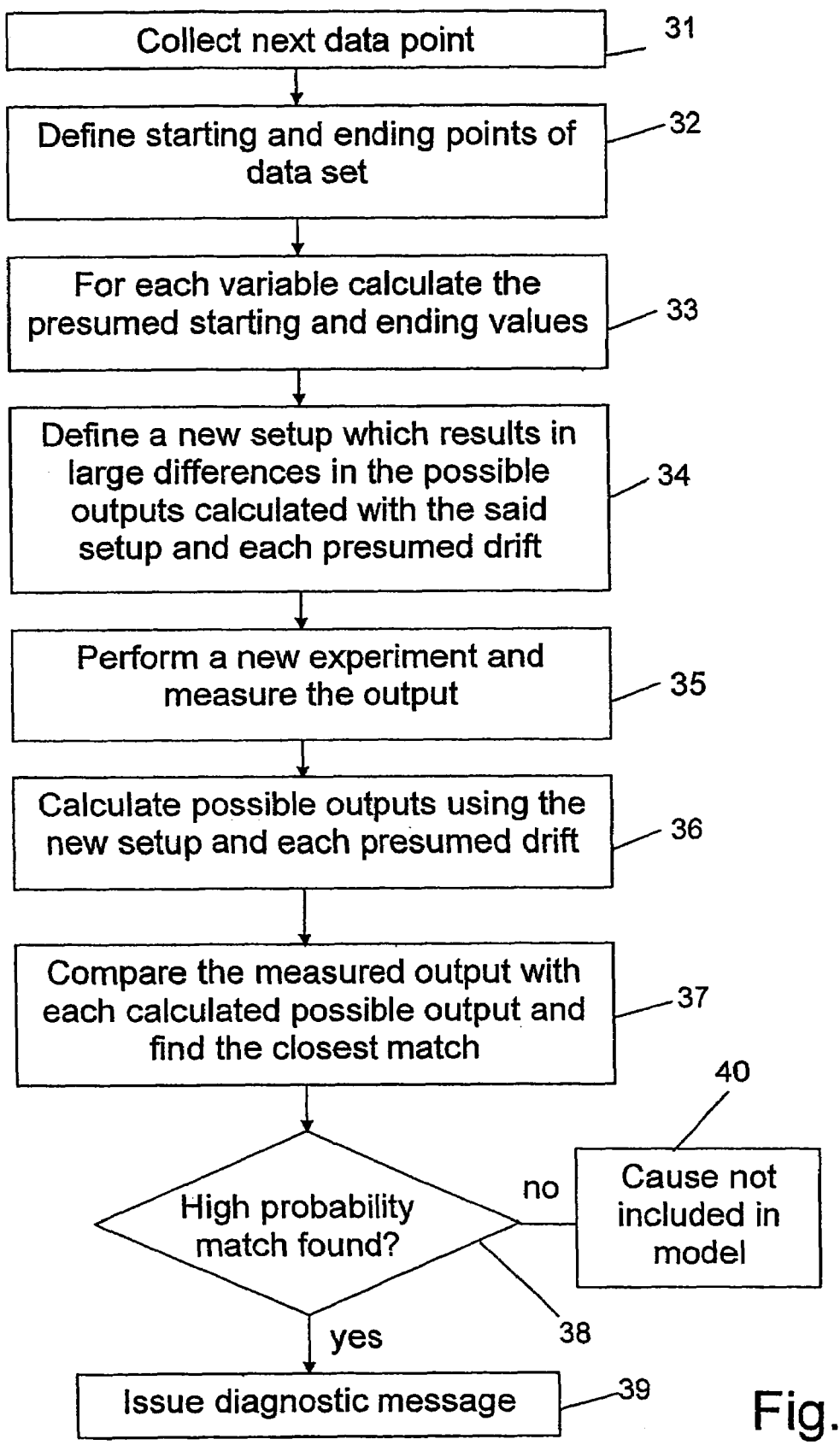
FIG. 3 illustrates in flow diagram form a third embodiment of the method of the invention.

FIG. 3 shows a block diagram of a third embodiment of the invention, for determining the cause of a process (or machine) drift. The embodiment comprises the following steps:

a. Defining from the data set the starting measurement point and the ending measurement point (step 32).

b. Using the process model, calculating the presumed ending input value of each variable, assuming it is the sole cause for the drift (step 33).

c. Defining a new setup that results in sufficiently large differences in the possible outputs calculated with the said new setup, and each presumed drift. A presumed drift is the difference between a presumed ending input value and its starting input value (step 34).

d. Performing a new experiment using the new setup defined in the previous step, and measuring the output (step 35).

e. Calculating the possible outputs by evaluating the model at the new setup, defined in step 3, and each presumed drift (step 36).

f. Comparing the measured output with each calculated possible output to find the closest match (step 37).

g. Determining whether a high probability match has been found (step 38).

h. If a high probability match has been found, issuing a diagnostic message accordingly (step 39).

i. If, however, a high probability match has not been found, it is concluded that the cause does not correspond with any variable in the model (step 40).

The finding of the new setup, as mentioned in step 3 above, can be carried out in various ways. For example, calculating the directional derivatives at each of the presumed ending input values, a direction for greatest spread in the output values can be found. Alternatively, if this direction results in a setup outside the allowable input ranges, then calculating the nearest setup within the input ranges which still results in a sufficient spread in the output values.

EXAMPLES

Example of the First Embodiment

Suppose the model for two output properties, y and z, for some process is given by:

$$y = 150 + 21*A^{0.05}*B^{0.125}*C*D^{-0.05}$$

$$z = 1e8*(A + 0.02*B + 0.02*C + 0.3*D)$$

where A, B, C, and D are variables that are either real inputs or the effect of internal mechanisms. If any of these quantities is not fixed in time (i.e. during production) then the outputs y and z, will change with time. Let the starting values (denoted by the '1' subscript), with which the machine properly operates are:

TABLE 1

| | |
|---|---|
| $A_1$ | 3 |
| $B_1$ | 150 |
| $C_1$ | 300 |
| $D_1$ | 25 |
| $y_1$ | 10750 |
| $z_1$ | 1.95e+9 |

Suppose that one of the inputs drifts to some new value. Then both y and z will similarly change to new values. The present invention shows that it is possible to determine which of the input variables drifted by calculating in turn, the presumed ending values of the inputs relating correspondingly to y and z. The input whose presumed ending value is the same from both y and z is determined as the one that is drifting. The example is performed by calculating each presumed input assuming that it is the one which was drifted, holding the others fixed. Next, separately for each variable a comparison is made between all its calculated presumed values. The variable which is assigned as the one which is drifted is the one for which all calculated presumed values are found to be the same, considering error variations.

Suppose, for instance, that A has drifted to 5 instead of the original value of 3, and the other inputs remain at their initial values. Then, the actual state of the machine, and the corresponding outputs are shown in Table 2:

TABLE 2

| | |
|---|---|
| $A_2$ | 5 |
| $B_2 = B_1$ | 150 |
| $C_2 = C_1$ | 300 |
| $D_2 = D_1$ | 25 |
| $y_2$ | 11024 |
| $z_2$ | 2.15e+9 |

Now, the calculations of the values required for each of the inputs to achieve these values of $y_2$ and $z_2$ if that input was the only one changed provide:

TABLE 3

| | $y_2$ | $z_2$ |
|---|---|---|
| $A'_2$ | 5 | 5 |
| $B'_2$ | 184 | 250 |
| $C'_2$ | 308 | 400 |
| $D'_2$ | 15 | 31.67 |

It should be noted that the calculated input values of table 3 are denoted in FIG. 1 in their general terms $A_y$, $A_z$, $B_y$, $B_z$, . . . etc. It can be easily determined that the calculations indicate that only input A is the same for the calculations based on the measurements of both y and z. It is therefore concluded that A must be the variable that had drifted, which we know to be true since that is the one that was changed to get the new values. Note that it is the only possible one, because this variable is the only one for which the calculated presumed values are separately determined to be the same from the expressions of both $y_2$ and $z_2$.

Example of the Second Embodiment

The second embodiment of the invention uses a data set that comprises a series of output measurements. The method can be used at any time during production and can be used with multiple outputs. For illustrative purposes, the following example is given for a single measured output, but the extension to multiple outputs is quite simple and straightforward.

Consider a process model for some output y given by:

$$y=150+21*A^{0.05}*B^{0.125}*C*D^{-0.05}$$

and a series of measurements of y during the production when the setup is presumably not changing, but actually it drifts in one of the inputs, or an internal mechanisms dominates as the cause for a change in the measured output. Suppose this starting setup and corresponding output is:

TABLE 4

| | |
|---|---|
| $A_1$ | 3 |
| $B_1$ | 150 |
| $C_1$ | 300 |
| $D_1$ | 25 |
| $y_1$ | 10750 |

As a machine working according to said model is not available, such a machine was first simulated, as shown in table 5. In order to simulate a changing output y due to drift of one of the inputs/internal mechanisms, the model was used to evaluate a drift in B, such that the value of the output has changed by 4%, after 15 "measurements" of the output property y have been made. Thus, it was simulated that B has drifted smoothly from its initial value of 150 (indicated in table 4) to a new value of 206.2, as shown in the column indicated "Drift value of B". Using same values for A, C, and D as indicated in table 4, and given the 15 drifted values of B between 153.7 and 206.2, the model was used to calculate 15 corresponding y values, as indicated in the column "New value of y" in table 5. It can be easily determined that 11180 is larger than the initial y value of 10750 by 4%. In order to simulate a process having a sigma of 0.25% of the y output, a Box-Muller algorithm was used in order to initiate random numbers, as appearing in the column indicated as "Process σ" in the table. Said random numbers were correspondingly imposed on the numbers of the "New value of y" column, to obtain the final simulated "measured" values of y, as appearing in the column "Simulated Value of y".

TABLE 5

| | Drift Value of B | New Value of y | Process σ | Simulated Value of y |
|---|---|---|---|---|
| 1 | 153.7 | 10783 | −13 | 10770 |
| 2 | 157.5 | 10815 | 14 | 10829 |
| 3 | 161.2 | 10846 | −8 | 10838 |
| 4 | 165.0 | 10877 | 12 | 10889 |
| 5 | 168.7 | 10907 | 28 | 10935 |
| 6 | 172.5 | 10937 | −13 | 10924 |
| 7 | 176.2 | 10966 | −5 | 10961 |
| 8 | 180.0 | 10994 | −18 | 10976 |
| 9 | 183.7 | 11022 | 12 | 11034 |
| 10 | 187.5 | 11050 | 7 | 11057 |
| 11 | 191.2 | 11077 | 17 | 11094 |
| 12 | 194.9 | 11103 | −45 | 11058 |
| 13 | 198.7 | 11129 | −9 | 11120 |
| 14 | 202.4 | 11155 | −34 | 11121 |
| 15 | 206.2 | 11180 | 44 | 11224 |

In the next step, a try was made to find a curve best fitting the output values, as simulated and appearing in the ""Simulated Value of y" column. When a second order polynomial curve was found to satisfactorily describe the "measured" data ("Simulated Value of y") and actually filtering the σ noise, an output ending point from the said curve was determined to be 11179 (it can be seen that is very close to the last calculated value of 11180. The output starting point was selected to be the initial value of y, 10750, as appearing in table 4.

It should be noted herein that any reasonable method, other than the one shown above, can be used to determine the output ending value From this ending output value of y (11179), the procedure continues to the calculating of a corresponding input value of A, for which y could have drifted from $y_1$ to 11179 with B, C, and D held fixed at $B_1$, $C_1$, and $D_1$. This is called the presumed value of A and will be denoted as $A_2$. A similar procedure follows for the calculating of starting input values for B, C, and D.

TABLE 6

| The presumed values are: | A | B | C | D |
|---|---|---|---|---|
| if A is drifting | 6.65 | 150 | 300 | 25 |
| if B is drifting | 3 | 206.2 | 300 | 25 |
| if C is drifting | 3 | 150 | 312.2 | 25 |
| if D is drifting | 3 | 150 | 300 | 11.3 |

Nest, for each variable, for several values in the range between the variable starting input value and its ending input value, calculations are made to determine corresponding y's. This simulates and artificial "drift" in each of said variables, in order to find their corresponding y's. It is preferable to carry out the calculation for as many values as possible in that range in order to obtain a smooth output curve, but generally any number greater than, say 5 values in that range suffice.

Table 7 provides, for each variable "drifting" in its corresponding range between its starting input value and its ending input value, the corresponding calculated y's. 21 such calculated y values are given in Table 7 for each variable. Table 7 summarizes this data and the value of y evaluated from the curve fit through the data.

TABLE 7

| y for A drifting from 3 to 6.65 | y for B drifting from 150 to 206.2 | y for C drifting from 300 to 312.2 | y for D drifting from 25 to 11.3 | y evaluated from curve fit through data |
|---|---|---|---|---|
| 10764 | 10780 | 10774 | 10771 | 10780 |
| 10779 | 10808 | 10797 | 10791 | 10801 |
| 10793 | 10835 | 10819 | 10812 | 10822 |
| 10809 | 10861 | 10842 | 10832 | 10844 |
| 10825 | 10886 | 10864 | 10853 | 10865 |
| 10841 | 10909 | 10886 | 10873 | 10886 |
| 10858 | 10932 | 10907 | 10893 | 10906 |
| 10875 | 10954 | 10928 | 10914 | 10927 |
| 10893 | 10975 | 10949 | 10934 | 10947 |
| 10912 | 10995 | 10970 | 10955 | 10967 |
| 10931 | 11014 | 10990 | 10975 | 10988 |
| 10951 | 11033 | 11010 | 10996 | 11007 |
| 10972 | 11052 | 11030 | 11016 | 11027 |
| 10994 | 11069 | 11050 | 11037 | 11047 |
| 11017 | 11087 | 11069 | 11057 | 11066 |
| 11041 | 11103 | 11088 | 11078 | 11086 |
| 11066 | 11119 | 11107 | 11098 | 11105 |
| 11092 | 11135 | 11126 | 11119 | 11124 |
| 11120 | 11151 | 11144 | 11139 | 11143 |
| 11149 | 11166 | 11162 | 11160 | 11161 |
| 11180 | 11180 | 11180 | 11180 | 11180 |

The closeness of the fitted curve to the others is evaluated by summing the squares of the differences between them, dividing by the number of points and taking the square root. The results are summarized in Table 8:

TABLE 8

| Difference between | Sqrt(Σ(y − y$_{fit}$)$^2$/N) |
|---|---|
| A drifting and Curve fit | 19.57 |
| B drifting and Curve fit | 2.52 |
| C drifting and Curve fit | 10.05 |
| D drifting and Curve fit | 42.08 |

Figure 4:
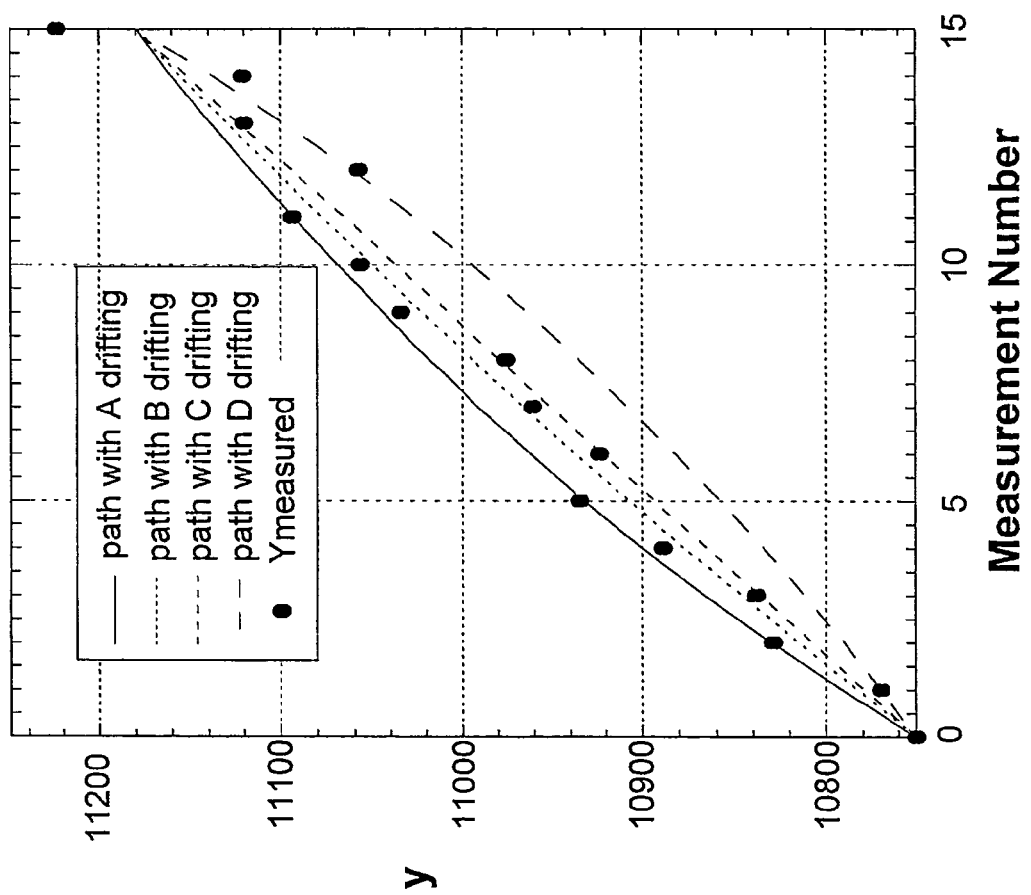
FIG. 4 is a graph showing how the one variable responsible for a drift is determined, according to the said second embodiment of the method of the invention.

It is clear from the table that the curve fit is closest to the data corresponding to B drifting. These paths and a curve fit through the data are shown in FIG. 4. In FIG. 4 the "measure" values of y are indicated, and also the four output curves corresponding to a case in which one of the variables have drifted. It can be seen that the data (particularly by way of the curve fit) is closest to the path where B is varying. This indicates that B was the variable that is varying for some reason. This is the correct answer in this case. For cases when the data is less well behaved (either due to large sigma or very slow drifts), the correspondence may be less clear. But at least it should be possible to eliminate one or more of the variables as possibilities and move on to the next test.

It should also be noted that the curve fit procedure as used herein has been given only as an example. Any other procedure for finding the variable for which the calculated output values show most similarity to the measured y values can also be used.

Example of the Third Embodiment

The third embodiment of the invention provides determination of the independent variable that is responsible to the drift in the output by performing one extra experiment. The extra experiment involves operating the machine in a newly defined setup. The question is how far to change the process inputs (variables) in performing the extra experiment. The independent variables are the process inputs and/or the internal mechanisms included in the model of the machine or process. As before, the variables are denoted by the letters A, B, C, and D, and will be referred to herein simply as 'inputs.' In this example, we consider, again, a process whose model is given by:

$$y=150+21*A^{0.05}*B^{0.125}*C*D^{-0.05}$$

with a starting setup and corresponding output values of:

TABLE 9

| $A_1$ | 3 |
|---|---|
| $B_1$ | 150 |
| $C_1$ | 300 |
| $D_1$ | 25 |
| $Y_1$ | 10750 |
| $\sigma_y$ | 0.4% |

Wherein, as before, $\sigma_y$ indicates the process sigma. It is assumed in this example that a drift in B has taken place, and its new value is 200. The corresponding y (according to the model) is 11138. A random, normally distributed contribution (y=0.4%) is imposed on top of this, as in the second example, to give an experimentally found output value of 11127. Next, from this value of y and the starting setup, we determine the amount that each of the input variables would have to be drifted by in order to account for this new value of y, assuming that this is the sole cause for the drift, and the rest of the variables remain in their initial values. These represent four possible states of the machine. The resulting possible set ups are:

TABLE 10

|  | A | B | C | D | Amount of drift |
|---|---|---|---|---|---|
| if drift is in A | 6 | 150 | 300 | 25 | ΔA = 3 |
| If drift is in B | 3 | 198 | 300 | 25 | ΔB = 48 |
| If drift is in C | 3 | 150 | 311 | 25 | ΔC = 11 |
| If drift is in D | 3 | 150 | 300 | 12 | ΔD = −13 |

Table 10 represents the only possible states of the machine, since only one of the four inputs was drifted. To determine which input is responsible for the drift in the output, one more experiment is performed. The setup for this experiment should provide outputs which differ by more than the statistical variation $\sigma_y$ is likely to be.

On the other hand, it is desirable for the new setup to be as close as possible to the present state of the machine. For some models this minimizes errors between the model and the machine and also helps preventing the machine from being operated outside the allowed ranges of the inputs. It is possible to calculate such a setup by using directional derivatives calculated from the model at each of the setups in the above table 10. Then, a direction that maximizes the difference in the new values of the output is chosen. Then using the known value of the process sigma, a distance in that direction can be computed. This new setup is computed to be:

TABLE 11

| A' | 10 |
|---|---|
| B' | 200 |
| C' | 300 |
| D' | 35 |

This is the setup that will be used in the process machine. The model will be evaluated once for each input variable using this setup and the amount by which that input variable has presumed to drift (rightmost column of table 10). These are calculated from the model as follows:

TABLE 12

|  | A | B | C | D |  |
|---|---|---|---|---|---|
| yA | 13 | 200 | 300 | 35 | 11785 |
| yB | 10 | 248 | 300 | 35 | 11951 |
| yC | 10 | 200 | 311 | 35 | 12044 |
| yD | 10 | 200 | 300 | 22 | 11891 |

Finally, an experiment is actually run on the machine and compared with these values. As said herein above, a machine having such a model is not available, so a simulation to such an experiment was made. To complete the example here, we therefore simulate the machine by using the model to determine what would be measured in that experiment and add a statistical variation. Since the drift was actually in B, the model is evaluated using (10,248,300,35) and adding a 0.4% normally distributed random number. The result of that simulated "experiment" is a value of y=11962. This "measured" value of y is closest to the value predicted in table 12 by assuming that the input which is drifting is B, where the calculate yB was found to be 11951.

Therefor it is concluded that B was drifted, and it can be seen that this is the correct answer.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A method for determining a root cause for a drift in at least one of a machine and a process, the function of which is determined by a model describing a relationship between at least one of setup and input variables and at least one output property, comprising:
   a. Assigning desired output properties for a product of at least one of said machine and said process, and allowed ranges for said properties;
   b. Assigning original values to said variables for obtaining by at least one of said machine and said process said assigned output properties within said assigned ranges;
   c. Measuring the various output properties of at least one of the machine and the process;
   d. When measuring an output property of at least one of the machine and the process that drifts from its assigned value, substituting the measured output properties in their corresponding model equations, and calculating for each variable in each equation its presumed value, assuming it is the sole cause of the drift; and
   e. Analyzing all presumed calculated variable values and the measured values of the output properties of at least one of the machine and the process to determine the variable that is most probably responsible for the drift.

2. A method according to claim 1, wherein the model is a model type that predicts process outputs given the values substituted for the variable, with sufficient accuracy.

3. A method according to claim 1 wherein the variable which is determined as the one responsible for the drift is the variable for which all its presumed calculated values are found to be the same for all output properties.

4. A method according to claim 1 wherein the variable which is determined as the one responsible for the drift is the variable for which all its presumed calculated values are found to be the same for all output properties, taking into account variations due to statistical distributions of the output properties and measurement errors.

5. A method according to claim 1, wherein:
   a. The measuring step comprises measuring of a series of output measurements during different production times;
   b. When a drift is realized in a measured output property, assigning a first early output measurement as a starting measurement, and a later output measurement as an ending measurement;
   c. The substituting step comprises, for each variable, defining its said original assigned value as the starting input value, and substituting the ending measurement in the model, and calculating for each variable its presumed ending input value, assuming it is the sole cause of the drift;
   d. In the analyzing step, for a plurality of points in the range between the starting input value and the ending input value of each variable, calculating from the model corresponding output values, assuming the other variables having values as originally assigned for obtaining the assigned output property; and
   e. Determining the variable whose output values calculated in step (d) are most similar to the output measured values, as the one most probably responsible for the drift.

6. A method according to claim 1, wherein the determining step comprises:
   a. For each variable, drawing a curve between its calculated output values, therefore obtaining an output curve corresponding to each variable; and
   b. Determining the variable whose output curve is most similar to the output measured values, as the one most probably responsible for the drift.

7. A method according to claim 5, taking into account statistical distributions of the output properties and measurement variation errors.

8. A method according to claim 1, wherein the analyzing step comprises:
   a. Finding a new set of variables being each within a limited range from its original value, that when the new set of variables, supplemented one at a time with the calculated amount of drift in each variable, is substituted in the model, results in sufficiently remote one from the other output property values;
   b. Calculating from the model separately for each presumed variable drift, by evaluating the model while substituting the new set and each of the presumed drifts in turn; and
   c. Performing an experiment in which the said found new set of variables are substituted in at least one of the machine and the process, and obtaining an experimental output; and
   d. Assigning the variable for which the calculated output is closest to the said experimental output as the variable responsible for the drift.

9. A method according to claim 8, wherein said new set of variables is found by using the model.

10. A method according to claim 8, wherein said new set of variables is found by applying directional derivatives to the model separately with respect to each variable.

11. A method according to claim 8, wherein said new set of variables is selected such that it provides outputs which differ by more than the statistical variation of at least one of the machine and the process, while staying as close as possible to the original values as assigned, to obtain sufficiently remote one from the other output property values.

12. A method according to claim 8, taking into account statistical distributions of the output properties and measurement variation errors.

13. A method according to claim 1, wherein the input variables of at least one of the machine and the process represent at least one of inputs and internal mechanisms.

14. A method according to claim 6, taking into account statistical distributions of the output properties and measurement variation errors.

* * * * *